United States Patent
Bontemps

(10) Patent No.: US 9,351,506 B2
(45) Date of Patent: May 31, 2016

(54) HEAT RESISTANT MOISTURE BARRIER FOR FOODS

(71) Applicant: NESTEC S.A., Vevey (CH)

(72) Inventor: Antoine Bontemps, Thayngen (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/407,242

(22) PCT Filed: Jun. 27, 2013

(86) PCT No.: PCT/EP2013/063479
§ 371 (c)(1),
(2) Date: Dec. 11, 2014

(87) PCT Pub. No.: WO2014/001437
PCT Pub. Date: Jan. 3, 2014

(65) Prior Publication Data
US 2015/0157044 A1    Jun. 11, 2015

(30) Foreign Application Priority Data

Jun. 29, 2012  (EP) .................................... 12174392

(51) Int. Cl.
| | | |
|---|---|---|
| *A23L 1/052* | (2006.01) | |
| *A23L 1/00* | (2006.01) | |
| *A23L 1/035* | (2006.01) | |
| *A23L 1/0562* | (2006.01) | |
| *A21D 13/00* | (2006.01) | |
| *A21D 15/04* | (2006.01) | |

(52) U.S. Cl.
CPC ........... *A23L 1/0067* (2013.01); *A21D 13/0025* (2013.01); *A21D 13/0032* (2013.01); *A21D 15/04* (2013.01); *A23L 1/00* (2013.01); *A23L 1/0055* (2013.01); *A23L 1/035* (2013.01); *A23L 1/0562* (2013.01); *A23V 2002/00* (2013.01)

(58) Field of Classification Search
CPC ..... A23L 1/0562; A23L 1/055; A23L 1/0067; A21D 13/0032; A23D 13/08; A23V 2200/209
USPC ................... 426/89, 102, 305, 601, 656, 658
See application file for complete search history.

(56) References Cited

U.S. PATENT DOCUMENTS

| | | | |
|---|---|---|---|
| 2007/0166437 A1* | 7/2007 | Bevers ................... | A21D 15/08 426/132 |
| 2008/0113067 A1 | 5/2008 | Sarma et al. | |

FOREIGN PATENT DOCUMENTS

| | | |
|---|---|---|
| EP | 0465801 | 1/1992 |
| EP | 1488704 | 12/2004 |
| GB | 2363049 | 12/2001 |

OTHER PUBLICATIONS

Perez-Gago et al., "Drying Temperature Effect on Water Vapor Permeability and Mechanical Properties of Whey Protein-Lipid Emulsion Films" J. Agric. Food Chem., 2000, vol. 48, pp. 2687-2692.

\* cited by examiner

*Primary Examiner* — Helen F Heggestad
(74) *Attorney, Agent, or Firm* — K & L Gates LLP

(57) ABSTRACT

A food product having at least a first part and a second part, where the water activity of the first part is lower than the water activity of the second part, and a moisture barrier between the first part and the second part, wherein the moisture barrier is formed upon dehydration of an emulsion comprising lipid a biopolymer emulsifier.

13 Claims, No Drawings

HEAT RESISTANT MOISTURE BARRIER FOR FOODS

CROSS REFERENCE TO RELATED APPLICATIONS

The present application is a National Stage of International Application No. PCT/EP2013/063479, filed on Jun. 27, 2013, which claims priority to European Patent Application No. 12174392.6, filed on Jun. 29, 2012, the entire contents of which are being incorporated herein by reference.

TECHNICAL FIELD

The invention relates to a moisture barrier for foods that is heat resistant and therefore capable of withstanding the temperatures associated with cooking or baking. In particular, the invention relates to a food product incorporating a hydrophobic layer formed from an emulsified oil and biopolymer emulsifier mixture.

BACKGROUND OF THE INVENTION

Many food products are comprised of more than one part where one part needs to be moist and another part needs to be dry in comparison. For example, foods having a pastry crust and a moist filling often need to have some form of layer of moisture resistant material between the pastry and the filling. In the absence of such a moisture resistant layer, the pastry may become too moist and soggy, and therefore unappealing to a consumer. Other examples of products requiring a moisture barrier include pies, pizzas, snacks, wraps, sandwiches, croque-monsieur, and many others.

Moisture barriers for use in food products are known. They are typically hydrophobic films. But most hydrophobic films suffer from significant drawbacks. There is currently no acceptable hydrophobic film for use as a moisture barrier in food products that are prepared by baking or similar heat treatment. Those barriers that are heat stable tend to have negative sensory properties, meaning that they leave a waxy coating in the mouth which is undesirable to many consumers. They have limited efficiency because the use of high temperature melting fats and waxes usually means that plasticisers are required to simplify the application of the fats or waxes and to avoid the formation of cracks in the barrier. Existing heat stable barriers typically have poor nutritional properties, particularly due to the levels of saturated and trans fatty acids in high temperature melting fats and waxes. Moreover, there are often regulatory restrictions on the application of some barrier materials (e.g. shellac).

Emulsified materials can be used as moisture barriers in food applications. For example, EP 0471558 describes an emulsion comprising lipid (74 to 95%) and a biopolymer emulsifier (5 to 26%). However, this high level of biopolymer is detrimental to the efficiency of the barrier. The more hydrophilic the material, the lower the efficiency of moisture migration prevention. More importantly, a film prepared from this emulsion encloses dispersed oil droplets and forms a continuous network of non-hydrophobic materials which therefore allows moisture migration through the film.

U.S. Pat. No. 5,543,164 also describes a moisture barrier prepared from an emulsified material. But again, the continuous matrix of biopolymer as well as the high level of biopolymer (5 to 20% protein) leads to a barrier that is not particularly effective.

U.S. Pat. No. 4,293,572 describes an emulsion that is applied to a food after baking or frying for the purpose of preventing moisture migration. The product must be cooled to below 40° C., clearly showing that this barrier is not heat stable. In other words, the barrier cannot be applied prior to cooking or baking of the food product.

There is therefore an ongoing need for a heat stable hydrophobic film for use in multi-component food products.

The applicant has now found that an emulsion of a lipid and a biopolymer emulsifier can form a heat stable hydrophobic film and is an effective moisture barrier in food products.

It is therefore an object of the invention to provide a food product incorporating a heat stable moisture barrier, or to at least provide a useful alternative.

SUMMARY OF THE INVENTION

In a first aspect of the invention there is provided a food product having at least a first part and a second part, where the water activity of the first part is lower than the water activity of the second part, and a moisture barrier between the first part and the second part, wherein the moisture barrier is formed upon dehydration of an emulsion, the emulsion comprising lipid in the amount of 45 to 55% by weight and an aqueous phase in the amount of 45 to 55% by weight which aqueous phase contains up to 4% by weight of a biopolymer emulsifier, and wherein the moisture barrier contains up to 4% by weight of the emulsifier.

Preferably the emulsifier is a whey protein isolate or whey protein concentrate, or a combination of both. The amount of whey protein isolate and/or whey protein concentrate in the moisture barrier is typically in the range 3 to 4% by weight. Further, the amount of protein in the whey protein isolate and/or whey protein concentrate is preferably at least 80% by weight.

In preferred embodiments of the invention, the lipid is selected from the group comprising butter fat, sunflower oil, rapeseed oil, olive oil, soy oil, fish oil, linseed oil, safflower oil, corn oil, algae oil, cottonseed oil, palm oil, palm kernel oil, coconut oil, grape seed oil, hazelnut oil, walnut oil, peanut oil, rice bran oil, sesame oil, cocoa butter, lard, tallow, hydrogenated oils, and fractions of oils or fats, and any combination thereof. Further preferred lipids are butter fat and sunflower oil.

The first part of the food product may be baked or cooked dough, crumble, cake, pancake, tortilla or crust. The second part may be cream, custard, mousse, fruit, vegetables, meat, fish, or any combination thereof.

Preferred food products of the invention include savoury or sweet pies, snacks, sandwiches, pizzas, and croque-monsieur.

In a second aspect of the invention there is provided a process for preparing a food product as claimed in claim 1 comprising the steps:

(i) preparing an emulsion comprising lipid in the amount of 45 to 55% by weight and an aqueous phase in the amount of 45 to 55% by weight which aqueous phase contains up to 4% by weight of a biopolymer emulsifier;

(ii) applying the emulsion to the first part of the food product to form a coating of the first part;

(iii) drying the coating;

(iv) combining the coated first part with the second part so that the coating forms a layer between the first part and the second part; and (v) heating the combined parts to form the food product.

The heating of step (v) is usually cooking or baking, but also be frying or other heating techniques.

Typical drying methods are air drying, ventilation, vacuum drying, or freeze drying. In a preferred embodiment of the invention, the emulsion is applied to the first part by spraying, but could also be applied by brushing or pressing, or any other known technique.

DETAILED DESCRIPTION

In general terms, the invention relates to a food product comprising two parts having different water activities and a moisture barrier between the parts so that a part that is intended to be moist does remain moist and a part that is not intended to be moist does not become moist. The moisture barrier is heat resistant so that it can withstand the high temperatures associated with cooking or baking a food product.

This is achieved using a specific type of emulsion to form the barrier. It has been found that an oil-in-water emulsion works well where the emulsion comprises an oil or fat in an aqueous matrix comprising protein material that acts as an emulsifier. The proteins are cross-linked to form a network in the aqueous phase which encapsulates oil droplets. On removal of water, once the emulsion has been applied as a layer to a food part, the network is destabilised. The protein network rearranges to form layers of protein material while the oil droplets fuse and form a more or less continuous layer between the outer protein layers. This multilayer barrier is stable to later heating.

The emulsifier is a biopolymer emulsifier. In the context of this invention "biopolymer" means a polymer produced by a living organism. Typical examples include proteins, and carbohydrates such as cellulose and cellulose derivatives.

The biopolymer emulsifier is preferably a protein or protein mixture. The protein can be any food-grade protein such as milk and/or whey proteins, soy proteins, pea proteins, caseinate, rice protein, corn protein, potato protein, pea protein, skimmed milk proteins as well as combinations thereof. In a preferred embodiment the protein is whey protein isolate or whey protein concentrate.

"Whey protein isolate" is an isolate obtained from whey, usually by filtration, containing more than 90% protein.

"Whey protein concentrate" is whey which has been dried to less than 10% moisture content, and typically contains 80 to 90% protein.

Preferred milk proteins or milk protein fractions include, for example, whey proteins, α-lactalbumin, β-lactalbumin, bovine serum albumin, acid casein, caseinates, α-casein, and β-casein.

As far as whey proteins are concerned, the protein source may be based on acid whey or sweet whey or mixtures thereof, and may include α-lactalbumin and β-lactalbumin in any proportions. The proteins may be intact or at least partially hydrolysed.

The amount of biopolymer emulsifier in the barrier appears to be important. The barrier comprises a maximum of 4% by weight of the protein. In a preferred embodiment, the barrier comprises at least 1% by weight of the protein. In a further preferred embodiment the barrier comprises 3 to 4% by weight of the protein. If too much emulsifier is present in the barrier, e.g. 5% by weight or more, the barrier loses its efficiency against moisture migration due to the higher level of hydrophilic material in the barrier and also because the intermediate oil layer between outer protein layers, as discussed above, will not form.

The biopolymer emulsifier, e.g. the protein material, is cross-linked. This is achieved by heat treatment, UV-radiation, high pressure treatment, chemical treatment or enzymatic treatment of the emulsion prior to applying the emulsion to one part of the food product. Cross-linking is needed to provide a network in the barrier capable of encapsulating the oil droplets and then rearranging on removal of water to form the intermediate oil layer between outer protein layers.

The lipid used for preparing the emulsion can be any food grade vegetable oil, or fat that is liquid or that can be liquefied at ambient conditions. Examples include butter fat, sunflower oil, rapeseed oil, olive oil, soy oil, fish oil, linseed oil, safflower oil, corn oil, algae oil, cottonseed oil, palm oil, palm kernel oil, coconut oil, grape seed oil, a nut oil such as hazelnut oil, walnut oil, or other nut oil, peanut oil, rice bran oil, sesame oil, cocoa butter, lard, tallow, oil/fat fractions such as lauric or stearic fractions, hydrogenated oils, and blends thereof, or combinations thereof. In preferred embodiments of the invention, the oil or fat is sunflower oil or butter fat.

The oil droplets of the emulsion typically have an average diameter in the range of about 0.1 to 100 µm. For example, if the emulsion is prepared using a homogenizer, the range is typically about 1 to 10 µm. If the emulsion is prepared using a colloid mill, the range is typically about 10 to 50 µm.

The moisture barrier of this invention is useful in any food product having more than one part where it is advantageous to prevent or minimise the migration of water from one part to another. There is a clear consumer benefit in maintaining the dryness or crunchiness of, for example, a pastry or biscuit layer of a food product and preventing moisture from a filling, such as custard or a fruit mix, from migrating to and softening the pastry or biscuit layer. The invention is therefore applicable to any food product where one part has a low water activity (a dry part) and an adjacent part has a higher water activity (a moist part).

The lower water activity (dry) part may typically be baked or cooked dough, crumble, cake, pancake, tortilla or crust. The higher water activity (moist) part may typically be cream, custard, mousse, fruit, vegetables, meat, or fish.

The food product of the invention may be prepared by first preparing the emulsion, applying the emulsion to one part of the food product to form a coating on that part, drying the coating to remove most, but not necessarily all, moisture, adding the second part, and then heating the combined parts to form the food product.

The emulsion can be applied as a continuous layer on a part, for example by spraying, brushing or stamping.

The drying step can be carried out by any commonly known drying technique such as air drying, ventilation, vacuum drying, freeze drying, etc.

Heating of the product may be by any standard cooking, baking or frying technique, including using conventional ovens or microwave ovens.

The product of the invention showed a drastic reduction in moisture migration from the wet filling into the crust in comparison with other known methods. The barrier efficiency was not affected by the baking or cooking step, showing that the barrier is stable to heat. Additionally, the barrier shows good efficiency against moisture migration over several months, even up to 12 months. The barrier of the invention has the additional advantage that an oil or fat that is low in saturated fatty acids can be used therefore providing a health benefit.

Any reference to prior art documents in this specification is not to be considered an admission that such prior art is widely known or forms part of the common general knowledge in the field.

As used in this specification, the words "comprises", "comprising", and similar words, are not to be interpreted in an exclusive or exhaustive sense. In other words, they are intended to mean "including, but not limited to.

The invention is further described with reference to the following examples. It will be appreciated that the invention as claimed is not intended to be limited in any way by these examples.

EXAMPLES

Example 1

General Preparation Method

Fat or oil is emulsified in an aqueous solution of biopolymer emulsifier to give an emulsion containing 45 to 55% by weight of oil or melted fat. The emulsification is carried out using a colloid mill and/or a high pressure homogenizer. The parameters are selected to give an oil or fat droplet size between 0.1 microns and 100 microns.

The emulsion is heated at 80° C. for 10 min to achieve cross-linking of the biopolymer which encapsulates the oil droplets in the emulsion.

The emulsion is applied as a continuous layer on one part of the food product, e.g. a short crust dough, by spraying or brushing, and then dried (typically to below 5% moisture content) in an oven for 5 min at 145° C., or at lower temperatures for longer time.

Finally a moist filling or topping is added (water activity up to 0.99). The product is baked in an oven, and then stored.

Example 2

Experiments

Experiments were conducted following the method of Example 1. The emulsion was prepared according to the recipes below and then applied to a pre-baked short crust dough (water activity 0.2). Barrier thicknesses of 0.5 mm and 1.0 mm were tested. A topping of custard mixed with fresh apple pieces (water activity 0.98) was added on top of the dough coated with the barrier. The product was baked for 40 minutes at 200° C. After cooling, the product was stored at −18° C. for several months and tested regularly in order to determinate how long the crunchiness of the baked dough can be preserved. Prior to testing, the products were thawed at +5° C. for a period of 24 hours.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. A food product comprising at least a first part and a second part, where the water activity of the first part is less than the water activity of the second part, and a moisture barrier between the first part and the second part, the moisture barrier is formed upon dehydration of an emulsion, the emulsion comprising lipid in the amount of 45 to 55% by weight and an aqueous phase in the amount of 45 to 55% by weight which aqueous phase contains 1% to 4% by weight of a proteinaceous biopolymer emulsifier and the moisture barrier contains up to 4% by weight of the emulsifier.

2. The food product of claim 1, wherein the emulsifier is selected from the group consisting of a whey protein isolate, whey protein concentrate, and a combination of both.

3. The food product of claim 2, wherein the amount of whey protein isolate and/or whey protein concentrate in the moisture barrier is 3 to 4% by weight.

4. The food product of claim 2, wherein the amount of protein in the whey protein isolate and/or whey protein concentrate is at least 80% by weight.

5. The food product of claim 1, wherein the lipid is selected from the group comprising butter fat, sunflower oil, rapeseed oil, olive oil, soy oil, fish oil, linseed oil, safflower oil, corn oil, algae oil, cottonseed oil, palm oil, palm kernel oil, coconut oil, grape seed oil, hazelnut oil, walnut oil, peanut oil, rice bran oil, sesame oil, cocoa butter, lard, tallow, hydrogenated oils, and fractions of oils or fats, and any combination thereof.

6. The food product of claim 5, wherein the lipid is butter fat or sunflower oil.

7. The food product of claim 1, wherein the first part is selected from the group consisting of baked or cooked dough, crumble, cake, pancake, tortilla and crust.

| | Experiment | | | | | | |
|---|---|---|---|---|---|---|---|
| | 1 | 2 | 3 | 4 | 5 | 6 | 7 |
| Emulsion recipe | | | | | | | |
| Water (%) | 45 | 45 | 45 | 50 | 50 | 50 | 50 |
| WPI (%) | 1.9 | 1.9 | 1.4 | 1.9 | | 1.9 | 1.9 |
| WPC (%) | | | | | 1.9 | | |
| Butter fat (%) | 53.1 | | 53.6 | 48.1 | | | |
| Sunflower oil (%) | | 53.1 | | | 48.1 | 48.1 | 48.1 |
| Process equipment used | | | | | | | |
| Colloid Mill | Yes | Yes | Yes | Yes | Yes | Yes | Yes |
| High pressure homogenizer | Yes | Yes | Yes | Yes | Yes | Yes | No |
| a) Barrier thickness 1 mm (after drying) | | | | | | | |
| Duration of crunchiness: | 4 months | 3 months | 3 months | >5 months | >5 months | >5 months | >3 months |
| Comment | | | | Accelerated shelf-life tests indicate these barriers could stand up to 1 year in these conditions. | | | |
| b) Barrier thickness 0.5 mm (after drying) | | | | | | | |
| Duration of crunchiness: | Not tested | Not tested | Not tested | >3 months | >4 months | >4 months | >4 months |
| Comment | | | | Accelerated shelf-life tests indicate these barriers could stand up to 5 months in these conditions. | | | |

8. The food product of claim 1, wherein the second part is selected from the group consisting of cream, custard, mousse, fruit, vegetables, meat, fish, and combinations thereof.

9. The food product of claim 1, which wherein the food product is selected from the group consisting of savoury or sweet pies, snacks, sandwiches, pizzas, and croque-monsieur.

10. A method for preparing a food product comprising the steps:
- preparing an emulsion comprising lipid in the amount of 45 to 55% by weight and an aqueous phase in the amount of 45 to 55% by weight which aqueous phase contains 1% to 4% by weight of a proteinaceous biopolymer emulsifier;
- applying the emulsion to the first part of the food product to form a coating of the first part;
- drying the coating;
- combining the coated first part with the second part so that the coating forms a layer between the first part and the second part; and
- heating the combined parts to form the food product.

11. The method of claim 10, wherein the heating step is selected from the group consisting of cooking, baking, and frying.

12. The method of claim 10, wherein the drying is selected from the group consisting of by air drying, ventilation, vacuum drying, and freeze drying.

13. The method of claim 10, wherein the emulsion is applied to the first part by a process selected from the group consisting of spraying, brushing, and pressing.

* * * * *